United States Patent
Zolotarsky et al.

(10) Patent No.: US 6,451,278 B1
(45) Date of Patent: Sep. 17, 2002

(54) METHOD OF CONVERTING AMMONIA

(75) Inventors: Ilya Aleksandrovich Zolotarsky; Aleksandr Stepanovich Noskov; Valery Aleksandrovich Kuzmin; Lyudmila Nikolaevna Bobrova, all of Novosibirsk; Evgeny Abramovich Brushtein, Moscow; Vladislav Aleksandrovich Sadykov; Lyubov Aleksandrovna Isupova, both of Novosibirsk; Valery Ivanovich Chernyshev, Moscow; Aleksei Ivanovich Potekha; Aleksandr Abramovich Khazanov, both of Permskaya oblast, Berezniki, all of (RU)

(73) Assignee: Institut Kataliza Imeni Boreskogo Sibirskogo Otdelenia Rossiiskoi Akademin Nauk, Novosibirsk Prospekt (RU)

( * ) Notice: Subject to any disclaimer, the term of this patent is extended or adjusted under 35 U.S.C. 154(b) by 61 days.

(21) Appl. No.: 09/614,268

(22) Filed: Jul. 12, 2000

(30) Foreign Application Priority Data

Aug. 11, 1999 (RU) ............................................ 99117038

(51) Int. Cl.$^7$ ................................................ C01B 21/26
(52) U.S. Cl. ...................................... 423/403; 423/404
(58) Field of Search .................................. 423/403, 404

(56) References Cited

U.S. PATENT DOCUMENTS

| | | | |
|---|---|---|---|
| 4,774,069 A | * | 9/1988 | Handley ...................... 423/403 |
| 4,869,891 A | * | 9/1989 | Handley ...................... 423/403 |
| 5,256,387 A | * | 10/1993 | Campbell .................... 423/403 |
| 5,266,293 A | * | 11/1993 | Fairey et al. ............... 423/403 |
| 5,690,900 A | * | 11/1997 | Smojver ...................... 423/403 |

FOREIGN PATENT DOCUMENTS

| | | |
|---|---|---|
| RU | 2100068 | 12/1997 |
| RU | 2119889 | 10/1998 |
| RU | 2128081 | 3/1999 |
| SU | 300057 | 4/1973 |

OTHER PUBLICATIONS

Pickwell, P.; "Nitric Acid Plant Optimisation," H M Stanley/BP Lecture, *Chemistry and Industry*, Feb. 21, 1981, pp. 114–118.

* cited by examiner

*Primary Examiner*—Wayne A. Langel
(74) *Attorney, Agent, or Firm*—Jenkens & Gilchrist, a professional corporation

(57) ABSTRACT

The invention relates to processes for high-temperature catalytic conversion of ammonia in a two-stage catalytic system in which the first stage, in the downstream direction of the flow of gas comprising at least ammonia and oxygen, is a layer of nettings made of alloys comprising platinoids, while the second stage is composed of catalysts that do not comprise noble metals. The field of use of the proposed invention extends to the production of nitric acid and prussic acid, and also hydroxylamine sulfate.

The object of the instant invention is to reduce the content and loss of platinoids and to increase the yield of the desired product.

This object is attained by passing a reaction gaseous mixture comprising ammonia and an oxygen-containing gas through a two-stage catalytic system in which the first stage in the downstream direction of the flow of gas is a layer of platinoid nettings, and 2–5 spaced layers of a catalyst of a regular honeycomb structure are used in the second stage of the catalytic system.

1 independent and 9 dependent claims of the set of claims.

10 Claims, No Drawings

METHOD OF CONVERTING AMMONIA

The invention relates to processes for high-temperature catalytic conversion of ammonia in a two-stage catalytic system in which the first stage, in the downstream direction of the flow of gas comprising at least ammonia and oxygen, is a layer of nettings made of alloys comprising platinoids, while the second stage is composed of catalysts that do not comprise noble metals. The field of use of the proposed invention extends to the production of nitric acid and prussic acid, and also hydroxylamine sulfate.

High-temperature catalytic conversion of ammonia is carried out, as a rule, at atmospheric and higher pressures (0.1–1.8 MPa) on nettings woven or knit from platinoid threads (an alloy of platinum with rhodium or platinum with rhodium, palladium and/or other platinoids). The reaction is accompanied by intensive release of heat, takes place at a very high speed and is limited by the processes of mass transfer.

The temperature of the gas during the production of prussic acid at a pressure of 0.2 MPa may reach 1300° C.

In the production of nitric acid during the conversion of ammonia into nitric oxide at a pressure of from 0.7 to 1.8 MPa, the optimum temperature of the nettings is 900–940° C. and the yield of nitric oxides is about 95%. At atmospheric pressure, the process takes place at 810–870° C. with a yield of 97–98%. The remaining ammonia is consumed for the formation of nitrogen. The processes of conversion of ammonia are characterized by low hydrodynamic resistance (several tens of mm of water column) and high linear speeds (to 15 m/s) [R. Pickwell, Nitric Acid Plant Optimization, Chem. and Ind. 4, 21, 1981, 114]. Depending on the conditions under which the process is carried out, the service life of the packet of platinoid nettings is from 1.5 to 16 months.

Substantial losses of platinoids in the course of the industrial process are characteristic for all processes of high-temperature conversion of ammonia, carried out with platinoid nettings.

When catalytic reactions are carried out on platinum, loosening up—corrosion of the surface of the catalyst is observed. The formation of crystalline structures in the course of the reaction of oxidation of ammonia is accompanied by an increase of the surface of the catalyst by up to 20 times (wherein the diameter of the catalytic platinoid thread is also increased), by losses of platinum in the form of volatile platinum oxides (chemical losses) and by mechanical carrying away of particles of the catalyst. At the end of the run, the surface of the first nettings in the downstream direction of the flow of gas is reduced, mainly as a result of loss of platinum. Catalytic corrosion takes place at a different speed depending on the positioning of the platinoid netting in the packet. Accordingly, both the surface of each netting and losses of platinum for each netting change. During the length of the run of the nettings, the loss of platinoids accompanying the corrosion of the surface of the nettings may be up to $2/3$ of the initial load. In the process of obtaining prussic acid, wherein the temperature of interaction of the reagents is substantially higher than is characteristic for the production of nitric acid, the catalytic nettings are even more fragile, and a tendency is observed toward the melting of the nettings. The losses of platinum also depend on the physicochemical properties of the alloy.

However, the losses of platinoids depend on the technological parameters and the structural execution of the process to a substantially greater degree than on the composition of the catalysts. in systems under pressure, the process is carried out at a higher temperature. The strength of the catalyst, linear speed and density of the gas increase. As a result the direct losses of the catalyst (per run) are substantially higher than at atmospheric pressure, which leads to a substantially shorter service life of the packet of nettings. Measurements of the distribution of speeds in contact apparatuses show that substantial heterogeneities of the flow exist over the cross section of the apparatus. In spite of the use of distribution devices of various constructions, the ammonia mixture may pass through one third of the area of the catalyst at a speed that is almost three times greater than the speed through the remaining two thirds of the area. A change in the hydrodynamic situation in the converter has a substantial influence on the value of the loss of platinoids.

A layer of regular structure, formed by a honeycomb catalyst block and positioned directly after the layer of platinoid nettings, not only makes it possible to reduce the amount of platinoids by reducing the number of nettings in the first stage, but also to reduce losses in the process of the run of nettings while maintaining the productivity of the product [RF patent No. 2100068, IPC 6 B 01 J 23/78, BI No. 36, 1997].

The solution most similar to the claimed technical solution is a method for catalytic oxidation of ammonia, the method consisting of passing a reaction gaseous mixture comprising ammonia and oxygen through a two-stage catalytic system in which the first stage in the downstream direction of the flow of gas is a layer of platinoid nettings, the second stage is one layer of a honeycomb catalyst of regular structure, and the ratio of the average working speed to the speed of sound under these conditions is maintained within the range of from $4.8 \cdot 10^{-4}$ to 0.24 in the jets of the gaseous mixture, moving along the honeycomb channels of the catalyst [RF application No. 97118457/25, IPC 6 C 01 B 21/26, BI No. 21, 1998].

During oxidation of the ammonia in both the first stage (platinoid nettings) and in the second stage (catalyst block), the process proceeds in an external diffusion mode. The effectiveness of the oxidation process is determined by the rate of mass exchange between the surface of the catalyst (the platinoid netting, the catalyst block) and the gaseous phase. In accordance with the mechanisms for the laminar flow of gas in the channels of a catalyst block, the coefficients of mass exchange are constant along the length of the channel everywhere except at the input part of the block. Due to the transient character of the flow of gas at the input into the catalyst block, the coefficients of mass exchange at these sections is 3–5 times higher than the average value along the length of the block. Thus, if 2 blocks 50 mm long are set up instead of one block 100 mm long, this will result in an increase in the degree of conversion of the ammonia. Simultaneously, due to the transient character of the flow of gas at the input sections of the channels in the catalyst block, the hydraulic resistance of the system as a whole will increase. This results in enhancement of the homogeneity of the hydrodynamic situation in the layer of the catalyst. Thus, a reduction of the initial heterogeneities of the speed field, which are characteristic for this construction of a reactor, will take place. As a result, the local heterogeneities of speed will be reduced at separate sections of the platinoid netting and the loss of platinoids will be substantially reduced.

The object of the instant invention is to enhance the yield of the desired product, for example, in the process of the production of nitric acid and hydroxylamine sulfate, this is nitric oxide, in the process of the production of prussic acid—HCN.

The object is attained by passing a reaction gaseous mixture comprising ammonia and an oxygen-containing gas through a two-stage catalytic system in which the first stage in the downstream direction of the flow of gas is a layer of platinoid nettings, and 2–5 spaced layers of a catalyst of a regular honeycomb structure are used in the second stage of the catalytic system. Each separate layer of the catalyst of honeycomb structure is arranged at a distance less than 60 mm from the neighboring layer, mainly at a distance which is in the range of from one half the thickness of the wall of the block channel to the thickness of that wall, a gas-permeable inert material is arranged between the layers of the catalyst of honeycomb structure. The height of each layer of the catalyst of honeycomb structure is not more than 0.5 Re·$d_e$, where Re is the Reynolds number equal to from 1 to 5·$10^4$, $d_e$ is the hydraulic diameter of a catalyst channel equal to from 1 to 20 mm.

The ratio of the value of the hydraulic resistance of the second stage of the catalytic system to the value of the hydraulic resistance of the first stage is from 0.2 to 4.

A catalyst of honeycomb structure is used in the process, the porosity of which, characterizing the volume of the empty spaces, or the open surface of which is 0.1–0.6, the thickness of the wall of which is (0.1–1.0)$d_e$, here $d_e$ is the hydraulic diameter of a channel of the catalyst, equal to 1–20 mm.

The catalyst of honeycomb structure comprises oxides of base metals in its composition and is a mixture of oxides of the general formula $(A_xB_yO_{3-z})_k(Me_mO_n)_f$, where: A is a cation of Ca, Sr, Ba, Mg, Be, Ln or mixtures thereof; B is cations of Mn, Fe, Ni, Co, Cr, Cu, V or mixtures thereof, x=0–2, y=1–2, z=0.8–1.7; $Me_mO_n$ is aluminum oxide and/or silicon oxide, zirconium oxide, chromium oxide, aluminosilicates, oxides of rare-earth elements (REE) or mixtures thereof, m=1–3, n 1–2, k and f are % by weight, with a ratio k/f=0.01–1, % by weight: ferric oxide 70–94, aluminum oxide 1–29, silicon oxide and/or REE oxides, zirconium oxide 1–29, the specific surface of which is more than 5 $m^2$/g.

The essence of the invention is illustrated by the following examples.

EXAMPLE 1

Prototype

The process is carried out in an industrial unit for the production of weak nitric acid with the diameter of the reactor for oxidation of ammonia being 1500 mm. The process of oxidizing ammonia to nitric oxide is carried out in a two-stage catalytic system wherein the first stage in the downstream direction of the flow of gas has a catalytic packet consisting of 9 woven platinoid nettings made of 0.092 mm diameter wire with the number of meshes equal to 1024 per 1 $cm^2$, the nettings having the composition of a platinoid alloy: Pt—81, Pd—15, Rh—3.5 and Ru—0.5%. The second stage in the downstream direction of the flow of gas uses one layer of a honeycomb catalyst block 100 mm high with a hydraulic diameter of the channel being 7 mm and thickness of the wall 1 mm. The porosity of the catalytic block is 0.77. The honeycomb catalyst has a composition, % by weight: $Fe_2O_3$—70, $Al_2O_3$—25, aluminosilicate fiber—5. The concentration of ammonia in an ammonia-air mixture is 10%, the absolute pressure is 7 atm, the normal speed of the ammonia-air mixture is 7 nm/s, the working temperature is 910° C. The hydraulic resistance of the packet of nettings is 48.0 mm of water column, the hydraulic resistance of a layer of honeycomb catalyst block is 6.0 mm of water column, the ratio of the value of the hydraulic resistance of the second stage to the value of the hydraulic resistance of the first stage is 0.126. The yield of nitric oxide wherein is 91.0%. The service life of the catalyst of the first stage is 2300 hours.

EXAMPLE 2

The process is carried out as in example 1, with the distinction that the second stage consists of two layers of honeycomb catalyst, the height of each being 50 mm, the composition, % by weight: ferrous oxide—80, aluminum oxide—10, silicon oxide—5 and REE oxides—5.

A gas-permeable Nichrome netting 1.5 mm high is arranged between the layers of the honeycomb catalysts. The yield of nitric oxide wherein is 93.8%. The service life of the catalyst of the first stage is 3200 hours.

EXAMPLE 3

The process of converting ammonia to hydrogen cyanide in the process of producing prussic acid is carried out in a two-stage catalytic system, wherein a catalytic packet consisting of 3 platinoid nettings with a thread diameter of 0.098 mm is arranged in the first stage in the downstream direction of the gas flow. The second stage in the downstream direction of the flow of gas is formed by three layers of a honeycomb catalyst block, each layer having a height of 50 mm, with a hydraulic diameter of the channel 3 mm and thickness of the wall 2 mm. The blocks are set up at a distance of 5 mm from each other. The distance between the platinoid netting and the first block is 5 mm. The porosity of the catalytic block is 0.36. The honeycomb catalyst has the composition: 10% by weight of lanthane ferrite on α-oxide aluminum. The composition of the reaction mixture, %: ammonia—11, methane—10, oxygen—16, nitrogen—balance. The pressure is atmospheric, the normal speed of the ammonia-air mixture is 2.5 nm/s, the working temperature is 1026° C. The hydraulic resistance of the packet of nettings is 57.1 mm of water column, the ratio of the value of the hydraulic resistance of the second stage to the value of the hydraulic resistance of the first stage is 2.1. On 3 new nettings 94.3% of the total amount of reprocessed ammonia is converted. In the second stage 67.3% of the ammonia fed thereto is converted. The total conversion of ammonia in the two-stage catalytic system is 98.1%. The run of the catalytic system is 1 year instead of the 3-month prescribed term for three platinoid nettings.

EXAMPLE 4

The process is carried out just as in example 2, with the distinction that the second stage consists of 4 layers of a honeycomb catalyst block, each having a height of 20 mm. The diameter of the channel ($d_e$) in the honeycomb block is 2 mm, the thickness of the wall 1 mm. The blocks are arranged at a distance of 1 mm from each other and are separated by a gas-permeable nichrome netting 2.0 mm high. The value of the hydraulic resistance of the first stage is 48 mm of water column, while the hydraulic resistance of the series of catalyst blocks is 190 mm of water column. Wherein, the ratio of the value of the hydraulic resistance of the second stage of the catalytic system to the value of the hydraulic resistance of the first stage is 3.9. The height of one layer of a honeycomb catalyst does not exceed 0.5 Re·$d_e$, where the Reynolds number for the 2 mm channel is 1000. The yield of nitrogen oxides wherein is 95.1%. The service life of the catalytic nettings is 3500 hours.

As is evident from the presented examples, the proposed method of converting ammonia makes it possible to increase the yield of desired products and may fine wide use in the production of nitric and prussic acids, and also hydroxylamine sulfate.

What is claimed is:

1. A method for catalytic conversion of ammonia, wherein a gaseous mixture comprising ammonia and an oxygen-containing gas is passed through a two-stage catalytic system in which the first stage in the downstream direction of the gaseous mixture is a layer of platinoid nettings, and the second stage is a layer of catalyst having a honeycomb structure with 2–5 space separated layers.

2. A method according to claim 1, wherein said separate layers are arranged at a distance less than 60 mm from a neighboring layer, which distance is in the range of from one half the thickness of the wall of the catalyst channel to the thickness of the wall.

3. A method according to claim 1, wherein a gas-permeable inert material is arranged between the layers of the catalyst.

4. A method according to claim 1, wherein the height of each layer of the catalyst is not more than $0.5 \, Re \, d_e$, where Re is the Reynolds number and $d_e$ is the hydraulic diameter of the catalyst channel.

5. A method according to claim 1, wherein the ratio of the value of the hydraulic resistance of the second stage of the catalytic system to the value of the hydraulic resistance of the first stage ranges from 0.2 to 4.

6. A method according to claim 1, wherein the catalyst has a porosity of 0.1 to 0.6.

7. A method according to claim 1, wherein the wall of the catalyst has a thickness of $(0.1-1.0) \, d_e$, where $d_e$ is the hydraulic diameter of the catalyst channel.

8. A method according to claim 1, wherein the catalyst comprises base metals in its composition.

9. A method according to claim 8, wherein the catalyst is composed of a mixture of oxides of the general formula $(A_xB_yO_{3z})_k(Me_mO_n)_f$, where, A is a cation of Ca, Sr, Ba, Mg, Be, Ln or mixtures thereof, B is a cation of Mn, Fe, Ni, Co, Cr, Cu, V or mixtures thereof, $x=0-2$, $y=1-2$, $z=0.8-1.7$; $Me_mO_n$ is aluminum oxide, silicon oxide, zirconium oxide, chromium oxide, aluminosilicates, oxides of rare-earth elements or mixtures thereof, $m=1-3$, $n=1-2$, k and f refer to % by weight with a ratio of $k/f=0.01-1$.

10. The method according to claim 9, wherein the catalyst has a specific surface area more than 5 m$^2$/g.

* * * * *